United States Patent Office 3,472,618
Patented Oct. 14, 1969

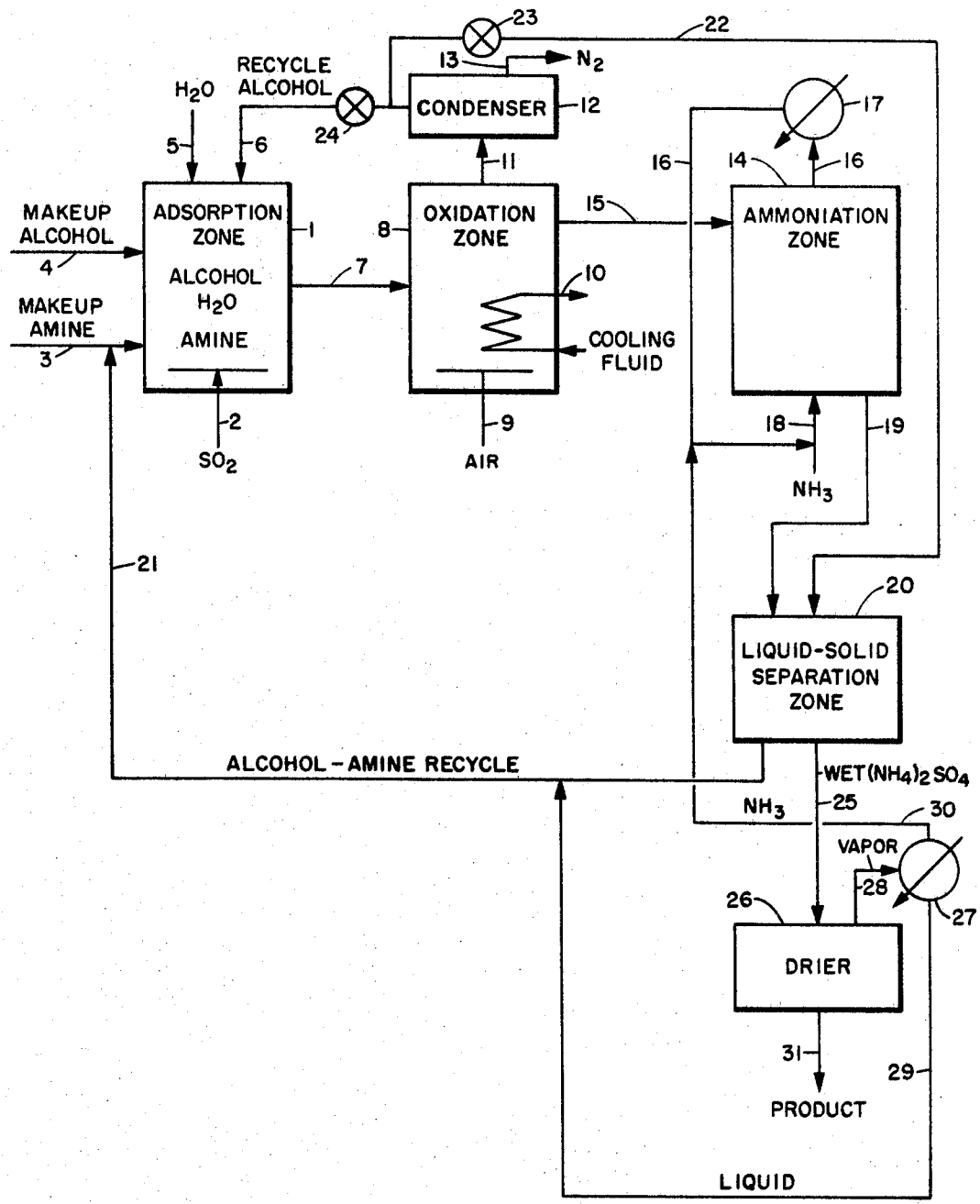

3,472,618
CONVERSION OF SULFUR DIOXIDE TO AMMONIUM SULFATE
Ralph Leroy Grimsley and Richard L. Every, Ponca City, Okla., assignors to Continental Oil Company Ponca City, Okla., a corporation of Delaware
Filed Feb. 27, 1967, Ser. No. 618,708
Int. Cl. C01c 1/24
U.S. Cl. 23—119                                         10 Claims

ABSTRACT OF THE DISCLOSURE

Sulfur dioxide is reacted with water and an amine such as diethylamine having a pKa constant greater than ammonia, the reaction being carried out in the presence of an alcohol solvent such as ethanol, the reaction product is oxidized without the necessity of a catalyst and finally the oxidized product is reacted with ammonia thereby forming ammonium sulfate which precipitates in the alcohol and reforms the original amine in alcohol solution.

FIELD OF INVENTION

This invention relates to the production of ammonium sulfate from $SO_2$, water, oxygen and ammonia. In a more limited aspect, this invention relates to the preparation of an ingredient useful in fertilizer compositions.

BACKGROUND

Ammonium sulfate has many industrial uses, however, a major use is in fertilizer compositions. Originally, ammonium sulfate was produced by reacting sulfuric acid and ammonia, but that process required the production of sulfuric acid and handling of such corrosive materials. The process is also relatively costly. Later it was discovered that $SO_2$, $H_2O$, $NH_3$ and $O_2$, all in gaseous state could be reacted to form ammonium sulfate in the presence of a suitable catalyst. These methods required close control of pressures and temperatures and generally also produced some by-product sulfur containing compounds such as sulfites or even sulfamates which the latter being highly undesirable as a fertilizer ingredient due to its herbicidal properties. Vian-Ortuno et al. in U.S. Patent 2,970,039 dated Jan. 31, 1961, largely overcame most of these undesirable features by reacting sulfurous gases with an amine base having a basicity less than ammonia in an aqueous solution, oxidizing the product, preferably in the presence of a catalyst, and subsequently regenerating the amine and forming ammonium sulfate in solution by contacting the oxidized product with ammonia. The ammonium sulfate had to then be crystallized out of solution. In the patented process, it is necessary to separate liquid phases, in some cases to concentrate the aqueous ammonium sulfate, to crystallize the product from solution and use of low temperatures.

SUMMARY OF INVENTION

These steps are eliminated by the process of this invention which comprises reacting sulfurous gas with water and an amine base stronger than ammonia (i.e. having a pKa greater than ammonia), in the presence of alcohol diluent, oxidizing the resulting product without the need of a catalyst, contacting the oxidized product in the presence of the alcohol with ammonia, and recovering precipitated ammonium sulfate. Thus, our process differs in two major aspects from that of Vian-Ortuno et al. First, we use a solvent system, alcohol, wherein the organic sulfate is soluble but in which the desired ammonium sulfate is insoluble, and, secondly, we use an amine base having a pKa greater than that of ammonia, i.e., a stronger base.

ADVANTAGES OF INVENTION

By use of the alcohol solvent system, we obtain the following advantages:
 (1) The separation of liquid phases is eliminated;
 (2) The ammonium sulfate solution need not be concentrated;
 (3) No crystallization step is required; and
 (4) We can use a strong base adsorbent.
By use of the strong base adsorbent, we obtain the following advantages:
 (1) Gases containing only trace amounts of $SO_2$ can be utilized due to the greater ability of the adsorbent to react with the $SO_2$.
 (2) A higher temperature can be tolerated in the adsorption and oxidation steps, both being exothermic; this is a decided advantage.
 (3) The elimination of a heat removal in the ammoniation step—the weaker the base the greater the heat increase in this step. With a strong base, the ammoniation step is endothermic and will just about balance out the heat given up by precipitation of ammonium sulfate.

DRAWING

The drawing is a block flow diagram of a preferred embodiment of our process.

DETAILED DESCRIPTION

As has been indicated, $SO_2$ is adsorbed by an amine having a pKa greater than ammonia in the presence of an alcohol. The $SO_2$ gas may be pure $SO_2$ but will most generally be gases from chemical or metallurgical operations, or such as are obtained by roasting of sulfides. The alcohol diluent or solvent is preferably a $C_1$ or $C_6$ aliphatic alcohol and can be primary, secondary or tertiary. In general we prefer an aliphtic primary alcohol of $C_1$ to $C_4$ such as methanol, ethanol, propanol, isopropanol, butanol and isobutanol and particularly prefer ethanol because of its general availability. However, secondary butanol, tertiary hexanol, pentanol, n-hexanol, isohexanol and the like are operable, the only requirement being that the alcohol be liquid at the operating temperature, a solvent for the amine sulfate and a non-solvent for the ammonium sulfate.

As has been stated, we prefer an amine base stronger than ammonia. By amine we are using the term in its broadest sense and it may be acyclic, cyclic or heterocyclic, therefore including in addition to amines, amine hydrocarbons, pyridines, piperidines, quinolines and the like. Representative of such amines include, but are not limited to n-butylamine, 1-butylpiperidine, cyclohexylamine, α,n-diaminopentane, diethylamine, dimethylamine, 1,2-dimethylpiperidine, 1,2-dimethyl-tetrahydro-pyridine, ethylamine, 1 - ethylpiperidine, iso-amylamine, iso-butylamine, iso-propylamine, methylamine, piperidine, propylamine, propylpiperidine, quinine, triethylamine, trimethylamine and the like. These compounds have a pKa ranging from 9.80 (trimethylamine) to 11.42 (1,2-dimethyl-tetra-hydro-pyridine) as compared to 9.24 for ammonia. Preferably the pKa will be at least 9.75.

Referring to the drawing, $SO_2$ is reacted in vessel 1 with water and the amine (in this example diethylamine) in the presence of an alcohol (ethanol in the example) to form $[(C_2H_5)_2NH_2]H_2SO_3$. The reactants are at such a temperature that the temperature in the reactor will not exceed the boiling point of the solvent, with ethanol, preferably below about 75° C. The $SO_2$ is introduced to vessel 1 via conduit 2 and bubbles into the liquids, re-circulating alcohol and diethylamine are mixed with make-up diethylamine and introduced to vessel 1 via conduit 3. Make-up alcohol is introduced via conduit 4, water via conduit 5 and recycle alcohol via conduit 6. The effluent product from vessel 1 passes to oxidation zone 8 via conduit 7 where oxygen or air introduced via conduit 9 bubbles through. Since the oxidation reaction in zone 8 is exothermic and we prefer to operate at atmospheric pressure, the temperature is maintained at 75° C. by means of cooling means 10. With a higher boiling alcohol, this cooling means would not be required, or if desired, this vessel could be operated under pressure to maintain the solvent in liquid state. Some alcohol along with inerts such as nitrogen pass overhead via conduit 11 to condenser 12 which with ethanol is maintained at 60° C. The inerts especially nitrogen are vented to the atmosphere via conduit 13. The condensed alcohol is then returned to reaction zone or vessel 1 via conduit 6. The reaction effluent from oxidation zone 8 passes to ammoniation zone 14 via conduit 15. Ammonia is bubbled through the liquids in zone 14 to reform the diethylamine which is soluble in the ammonia and forms $(NH_4)_2SO_4$ which precipitates in the alcohol. Excess ammonia passes overhead via conduit 16 through cooler 17 where it is cooled to about 60° C. and is recycled back to zone 14 with fresh ammonia via conduit 18. The slurry from zone 14 passes via conduit 19 to separation zone 20 (such as a revolving filter) where the bulk of the liquid is separated from the precipitate and is passed back to conduit 3 via conduit 21. From condenser 12 is provided conduit 22 which permits passing alcohol via conduit 22 as a wash liquid in filter 20, if desired, by opening valve 23 and closing valve 24. In this case, this alcohol will also be returned to conduit 3 via conduit 21. The filter cake (wet ammonium sulfate) passes via conduit 25 to drier 26 where the excess ammonia, diethylamine and alcohol are driven off and pass to condenser 27 via conduit 28. The diethylamine and alcohol are condensed and pass via conduit 29 to conduit 21 where it is mixed with the bulk of the liquid from filter 20 and passes along therewith back to zone 1. The ammonia passes overhead from condenser 27 via conduit 30 back to conduit 18 where it is again passed through zone 14. Pumps, valves, sparges, and the like have not been shown since it is well within the skill of the art to provide these. The temperatures shown are representative but should not be considered limiting even for the reactants illustrated in this description. Although we have found a catalyst is not needed in the oxidation step, it would be within the skill of the art to use one if desired. We have illustrated the invention wherein only nitrogen passes overhead from condenser 12. Ordinarily, an excess of air would be used to insure complete oxidation and excess $O_2$ would also be vented via conduit 13.

SPECIFIC EXAMPLE

To 100 grams of ethanol were added 73 grams of diethylamine and 9 grams of water. 32 grams of $SO_2$ were then added and the contents thoroughly mixed. The alcohol served as a solvent and the remaining ingredients were in stoichiometric amount according to the equation:

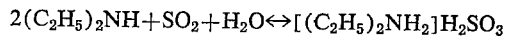

Air was bubbled into the solution to oxidize the product according to the equation:

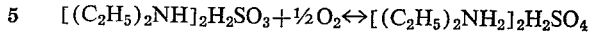

The reactants as well as the oxidized products were soluble in the alcohol. The system was then treated with gaseous ammonia according to the following equation:

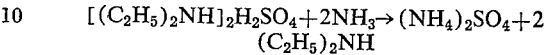

The $(NH_4)_2SO_4$ precipitated and was filtered and washed with alcohol. The filter cake was dried and the amount of ammonium sulfate recovered was substantially theoretical.

Having thus described our invention, we claim:

1. A process of producing ammonium sulfate from sulfur dioxide containing gas, said process comprising passing the sulfur dioxide gas through an alcohol solution of an amine having a pKa greater than that of ammonia along with a stoichiometric amount of $H_2O$, thereby binding said sulfur dioxide to said amine and water to form an organic sulfite, adding oxygen to the thus-formed sulfite so as to substantially oxidize the same to the sulfate, treating the resulting sulfate with ammonia thereby freeing said amine and precipitating ammonium sulfate and recovering the precipitate from the alcohol solution of the amine.

2. The process of claim 1 wherein the alcohol is a $C_1$ to $C_6$ alcohol.

3. The process of claim 1 wherein the alcohol is a $C_1$ to $C_4$ alcohol.

4. The process of claim 3 wherein the pKa of said amine is at least 9.75.

5. The process of claim 4 wherein said alcohol is ethanol.

6. The process of claim 5 wherein said amine is diethylamine.

7. The process of claim 5 wherein said amine is n-butylamine.

8. The process of claim 5 wherein said amine is dimethylamine.

9. The process of claim 5 wherein said amine is trimethylamine.

10. The process of claim 5 wherein said amine is isoamylamine.

References Cited

UNITED STATES PATENTS 2,970,039  1/1961  Vian-Ortuno et al. ____ 23—119
3,330,620  7/1967  Vian-Ortuno et al. ____ 23—119

OSCAR R. VERTIZ, Primary Examiner

E. C. THOMAS, Assistant Examiner

U.S. Cl. X.R.

23—2, 178